(12) United States Patent
Maniloff et al.

(10) Patent No.: US 12,113,579 B2
(45) Date of Patent: Oct. 8, 2024

(54) FAST OPTICAL RECEIVER RECOVERY ON CLIENT SIDE USING OPTICAL INTERCONNECTS WITH DSPS

(71) Applicant: Ciena Corporation, Hanover, MD (US)

(72) Inventors: Eric S. Maniloff, Stittsville (CA); Larry Babineau, Ottawa (CA); Wang-Hsin Peng, Ottawa (CA); Joanne Wilde, Ottawa (CA)

(73) Assignee: Ciena Corporation, Hanover, MD (US)

( * ) Notice: Subject to any disclaimer, the term of this patent is extended or adjusted under 35 U.S.C. 154(b) by 51 days.

(21) Appl. No.: 17/973,849

(22) Filed: Oct. 26, 2022

(65) Prior Publication Data

US 2023/0127848 A1 Apr. 27, 2023

Related U.S. Application Data

(60) Provisional application No. 63/272,133, filed on Oct. 26, 2021.

(51) Int. Cl.
  *H04B 10/06* (2006.01)
  *H04B 10/69* (2013.01)

(52) U.S. Cl.
  CPC ......... *H04B 10/691* (2013.01); *H04B 10/693* (2013.01)

(58) Field of Classification Search
  CPC .. H04B 10/691; H04B 10/693; H04B 10/032; H04B 10/035; H04B 10/038; H04B 10/40; H04B 10/0795; H04B 10/2507; H04Q 11/0005; H04Q 11/062; H04Q 11/0067; H04Q 11/0066; H04Q 11/0062
  USPC ... 398/1, 2, 3, 4, 5, 7, 8, 33, 38, 25, 26, 27, 398/10, 13, 17, 22, 23, 24, 202, 208, 209, 398/135, 136, 137, 138, 139, 158, 159, 398/45, 48, 49, 210, 212, 213, 214
  See application file for complete search history.

(56) References Cited

U.S. PATENT DOCUMENTS

| 5,365,510 A | 11/1994 | Nicholson et al. |
| 5,838,924 A * | 11/1998 | Anderson .......... H04Q 11/0478 709/239 |

(Continued)

FOREIGN PATENT DOCUMENTS

| CA | 2065558 A1 | 10/1993 |
| CA | 2309527 A1 | 1/2001 |

(Continued)

OTHER PUBLICATIONS

Mar. 2, 2023, International Search Report and Written Opinion for International Patent Application No. PCT/US2022/047838.

*Primary Examiner* — Hanh Phan
(74) *Attorney, Agent, or Firm* — Baratta Law PLLC; Lawrence A. Baratta, Jr.

(57) ABSTRACT

The present disclosure relates to systems and methods for fast digital signal processor (DSP) optical receiver recovery, namely for optical modems configured on a client side. This approach can be used in optical protection switching (OPS) applications to allow switching between two client links fast, i.e., within 50 ms. A receiver (Rx) digital signal processor (DSP) in an optical receiver includes circuitry configured to detect traffic is interrupted on a current link, enter a holdoff period, and one of i) receive good traffic during the holdoff period and ii) have the holdoff period expire that causes a notification to a host device and retrain to acquire an optical signal.

20 Claims, 10 Drawing Sheets

(56) References Cited

U.S. PATENT DOCUMENTS

| | | |
|---|---|---|
| 6,313,771 B1 | 11/2001 | Munroe et al. |
| 6,952,396 B1 | 10/2005 | Cottreau et al. |
| 7,065,298 B1 | 6/2006 | Munroe et al. |
| 7,369,514 B1 | 5/2008 | Peng et al. |
| 7,467,056 B2 | 12/2008 | Maniloff et al. |
| 7,483,450 B1 | 1/2009 | Giese et al. |
| 9,088,380 B2 | 7/2015 | Ibach et al. |
| 9,287,970 B2 * | 3/2016 | Nonaka ................ H04B 10/032 |
| 9,793,984 B2 | 10/2017 | Sinclair et al. |
| 9,806,801 B2 | 10/2017 | Maniloff |
| 10,348,410 B1 | 7/2019 | Charlton et al. |
| 10,396,891 B2 | 8/2019 | Maniloff et al. |
| 10,637,604 B2 | 4/2020 | Gareau et al. |
| 10,877,230 B1 | 12/2020 | Graham et al. |
| 10,944,478 B2 * | 3/2021 | Zhang ................ H04B 10/504 |
| 10,979,139 B1 | 4/2021 | Ibach et al. |
| 10,985,837 B2 | 4/2021 | Ibach et al. |
| 11,101,882 B1 | 8/2021 | Ibach et al. |
| 11,309,984 B2 | 4/2022 | Ibach et al. |
| 2001/0046074 A1 * | 11/2001 | Kakizaki ............ H04B 10/0795 398/5 |
| 2002/0114998 A1 | 8/2002 | Maniloff et al. |
| 2003/0142390 A1 | 7/2003 | Parry et al. |
| 2004/0013075 A1 | 1/2004 | Johnson et al. |
| 2004/0126113 A1 | 7/2004 | Johnson et al. |
| 2004/0208432 A1 | 10/2004 | Mak et al. |
| 2006/0013133 A1 | 1/2006 | Peng et al. |
| 2018/0167160 A1 | 6/2018 | Gareau et al. |
| 2020/0228197 A1 * | 7/2020 | Bhatnagar .......... H04Q 11/0062 |
| 2020/0271878 A1 | 8/2020 | Maniloff et al. |
| 2021/0405314 A1 | 12/2021 | Wingrove et al. |

FOREIGN PATENT DOCUMENTS

| | | |
|---|---|---|
| CA | 2322905 A1 | 5/2001 |
| EP | 1422890 B1 | 10/2007 |
| EP | 1 226 737 B1 | 1/2009 |
| WO | 2011088555 A1 | 7/2011 |
| WO | 2020231877 A1 | 11/2020 |
| WO | 2021113293 A1 | 6/2021 |

* cited by examiner

Optical Protection Switch

FIG. 1

T0: TX1 / TX2 lasers both on (OPS selecting TX1)
T1: TX1 client TX laser turned off (OPS switches to select TX2)
Disruption into Plug Optical Rx (t1-t0)

FAST OPTICAL RECEIVER RECOVERY ON CLIENT SIDE USING OPTICAL INTERCONNECTS WITH DSPS

CROSS-REFERENCE TO RELATED APPLICATION(S)

The present disclosure claims priority to U.S. Provisional Patent Application No. 63/272,133, filed Oct. 26, 2021, and entitled "Fast optical receiver recovery on client side using optical interconnects with DSPs," the contents of which are incorporated by reference in their entirety.

FIELD OF THE DISCLOSURE

The present disclosure generally relates to optical networking. More particularly, the present disclosure relates to systems and methods for fast digital signal processor (DSP) optical receiver recovery, namely for optical interconnects configured on a client side.

BACKGROUND OF THE DISCLOSURE

Optical modems (transceivers, transmitters and receivers, pluggable modules, etc.) are equipped with DSP circuitry to perform various functions. The optical interconnects can include non-return-to-zero (NRZ), pulse amplitude modulation (PAM), and coherent modulation (e.g., quadrature amplitude modulation (QAM) and the like). Of note, the DSP can be used in any of these types of modems. An optical link is formed by a transmitter (Tx) connected to a receiver (Rx) via a fiber interconnect. There are various applications which require a fiber switch for protection, such as optical protection switching (OPS), and this needs to be quick where the Tx is switched to a different fiber and the Rx is configured to receive the Tx from the different fiber. For example, there is a traditional requirement of 50 ms or less for the Tx and Rx to come back online. However, in typical DSP implementations, recovery between a Tx and Rx is in seconds, including up to 10 seconds or more.

On the line side, there were efforts at decreasing this time in commonly-assigned U.S. Pat. No. 9,100,116, issued Aug. 4, 2015, and entitled "SHORT-TERM OPTICAL RECOVERY SYSTEMS AND METHODS FOR COHERENT OPTICAL RECEIVERS," the contents of which are incorporated by reference in their entirety. This approach focused on increasing the recovery speed in coherent modems on the line side. Here, the switch is typically on disparate fibers which could have vastly different parameters (e.g., distance, fiber type, dispersion, loss, etc.).

BRIEF SUMMARY OF THE DISCLOSURE

The present disclosure relates to systems and methods for fast digital signal processor (DSP) optical receiver recovery, namely for optical interconnects configured on a client side. A receiver (Rx) digital signal processor (DSP) in an optical receiver includes circuitry configured to detect traffic is interrupted on a current link, enter a holdoff period, and one of i) receive good traffic during the holdoff period and ii) have the holdoff period expire that causes a notification to a host device and retrain to acquire an optical signal.

In an embodiment, a receiver (Rx) digital signal processor (DSP) in an optical receiver is described, and the Rx DSP includes circuitry configured to detect traffic is interrupted on a current link associated with the optical receiver, enter a holdoff period, and one of i) receive good traffic during the holdoff period and ii) have the holdoff period expire that causes a notification to a host device and retrain to acquire an optical signal.

The circuitry can be configured to refrain, during the holdoff period, from a retrain to acquire the optical signal and refrain from any notification to the host device. The circuitry can be configured to change settings, after entering the holdoff period, for the optical signal to one of default settings and predetermined settings for a new link. The settings for the optical signal can be maintained during the holdoff period. The notification includes one or more of loss of signal (LOS) and loss of light (LOL). The circuitry can be further configured to receive a configuration whereby the holdoff period is used.

The circuitry can be further configured to, responsive to receiving the good traffic during the holdoff period, continue to process the good traffic and retrain on the optical signal while the good traffic is processed. The optical receiver can be connected to an optical protection switch (OPS). The optical receiver can be connected to an optical coupler whereby two different links including the current link are capable of sending the optical signal. Corresponding optical transmitters on the two different links can be configured for fast turn off and turn on.

The optical signal can include non-return-to-zero (NRZ) modulation, pulse amplitude modulation (PAM), or coherent modulation. A transmitter for the current link and a transmitter for protection link can have settings that are adjusted such that there is no need to adjust the Rx DSP when switching between links.

In another embodiment, a method implemented in a receiver (Rx) digital signal processor (DSP) in an optical receiver includes detecting traffic is interrupted on a current link associated with the optical receiver, entering a holdoff period, and one of i) receiving good traffic during the holdoff period and ii) having the holdoff period expire that causes a notification to a host device and retrain to acquire an optical signal.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Again, the present disclosure relates to systems and methods for fast digital signal processor (DSP) optical receiver recovery, namely for optical interconnects configured on a client side. The present disclosure is for DSP-based optical interconnects (note, the terms transmitter/receiver, transceiver, transponder, pluggable optical module, plug, etc. are equivalent to an optical interconnect). The present disclosure provides various approaches for fast optical switching at both the Tx and Rx side of a link. The fast optical switching is for shorter reach applications such as with an optical protection switch (OPS), transponder protection tray (TPT), 1+1, etc. The present disclosure relates to various types of modems, including non-return-to-zero (NRZ), pulse amplitude modulation (PAM), and coherent modulation (e.g., quadrature amplitude modulation (QAM) and the like). For example, the present disclosure can be implemented in QSFP-DD pluggable modules, QSFP-28 pluggable modules, etc.

DSP Adaptation

When a DSP-based Tx and Rx switch from one fiber to another or a switching occurs such that a Rx receives a signal from a different Tx, there is a requirement to run an adaptation process, i.e., control loop, signal acquisition process, etc. In various types of DSP-based modems, i.e., NRZ, PAM, coherent, etc., the conventional adaptation processes take seconds even up to 10 seconds or more. With simple optical protection schemes, there is a requirement for fast switching (milliseconds, e.g., 50 ms or less). The conventional approach in seconds causes loss of signal (LOS) to higher layers (e.g., Ethernet) and the higher layers perform protection. This defeats the purposes of the simple optical protection schemes, e.g., OPS, TPT, and the like. Those skilled in the art will appreciate the present disclosure is described with reference to OPS and TPT as example optical protection schemes, but those skilled in the art will recognize various other configurations are contemplated (other applications may include the need to recover fast from client Rx transient faults coming from other subtending equipment, such as, e.g., routers or other protection schemes where there is a disruption in signal).

The adaptation process is performed to determine various settings on the Rx, including eye optimization, continuous time linear equalization (CTLE), filter settings, and the like.

The adaptation process can also be performed at the Tx to determine settings there, such as launch power, pre/post cursor settings, etc. The adaptation process must account for differences between the eyes from the two Tx's. These differences can include amplitude, eye-heights, and distortion. The impairments required to be equalized are more intensive for more complex modulation types; for example, a PAM-4 signal requires more complicated equalization than an NRZ signal. This complex approach requires certain parameters to be sampled over time prior to comparing with thresholds which can be time consuming.

Optical Protection

The application for the fast optical switching is in simple optical protection schemes, such as OPS, TPT, 1+1, etc. These can be deployed in applications, such as within a data center, short reach campus networks, metro networks, etc. The objective of these simple optical protection schemes is quick, efficient, and low-cost protection.

Figure 1:
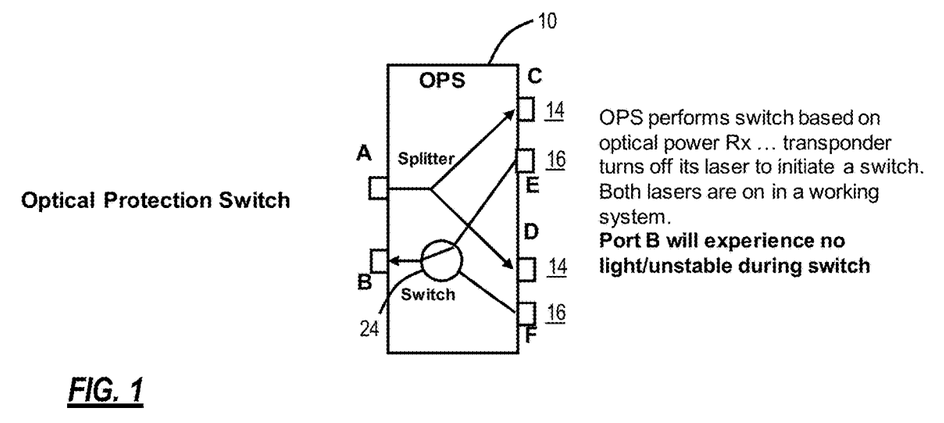
FIG. 1 is a block diagram of an OPS module.
Figure 2:
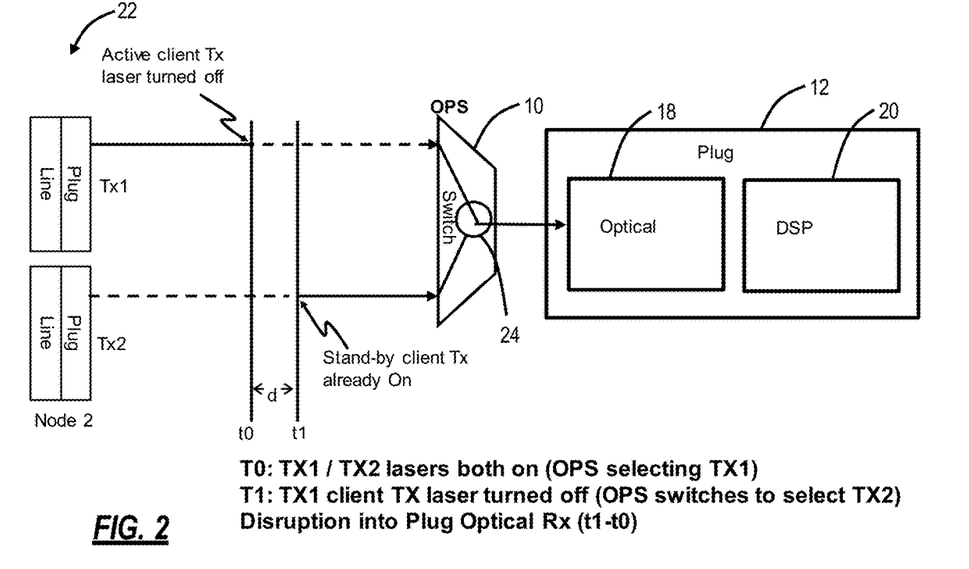
FIG. 2 is a block diagram of the OPS at the Rx side modem.

FIG. 1 is a block diagram of an OPS module 10. FIG. 2 is a block diagram of the OPS module 10 at a Rx side modem 12. The OPS module 10 shows a transmit side 14 to two fibers C, D and a receive side 16 from two fibers E, F. On the Rx side, the OPS module 10 can perform a switch based on optical power Rx, only one of the fibers E, F will be connected to the fiber B via a switch. On the Tx side, the fiber A from the Tx sends light to both the fibers C, D. In an embodiment, the OPS module 10 performs a switch based on optical power RX, e.g., a transponder turns off its laser to initiate a switch. Both lasers are on in a working system. Port B will experience no light/unstable during switch. Other switching approaches are also contemplated, such as based on monitoring a signal, looking for an alarm indication signal (AIS), based on bit error ratio (BER), and the like.

The Rx side modem 12 includes an optical front end 18 and a DSP 20. There is a node 2 at a far end from the Rx side modem 12. With the OPS module 10, the node 2 includes two Tx modules 22, Tx1, Tx2. FIG. 2 visually illustrates a time delay, d, between turning off the active Tx1 and either the stand-by Tx2 being activated or a switch 24 in the OPS module 10 being switched. (note: This isn't clear to me how it's illustrated, since it appears that Tx2 is being turner on).

Figure 3:
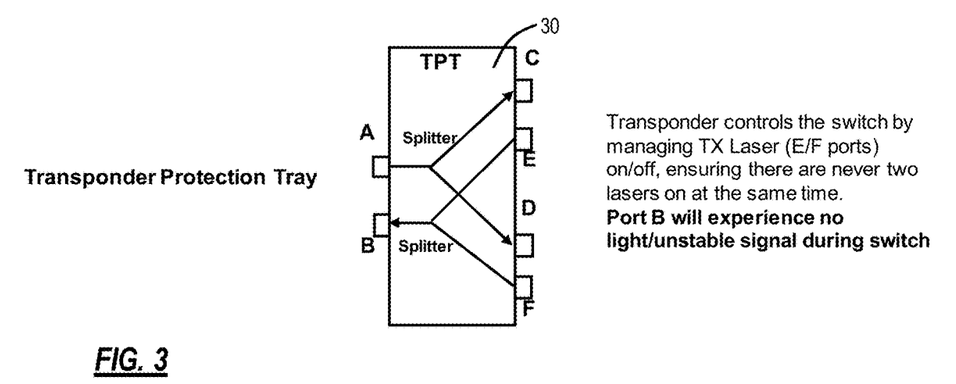
FIG. 3 is a block diagram of a TPT module.
Figure 4:
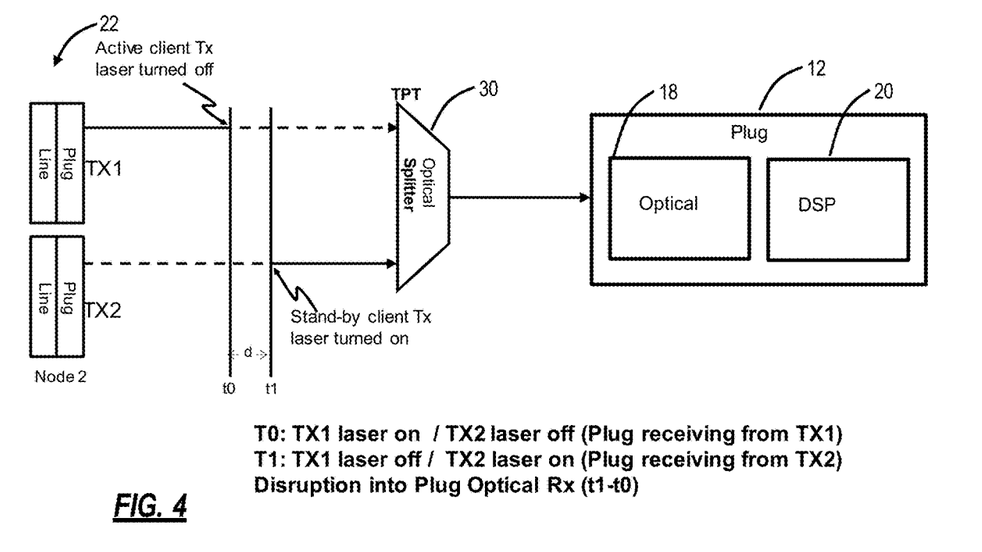
FIG. 4 is a block diagram of the TPT at the Rx side.

FIG. 3 is a block diagram of a TPT module 30. FIG. 4 is a block diagram of the TPT module 30 at the Rx side modem 12. The TPT module 30 is a type of 1+1 protection with a similar architecture as the OPS module 10 on the Tx side and a coupler on the Rx side. With an OPS module 10, there is one Tx, and with the TPT module 30, there are two Tx's and on the Rx side, there are never two lasers on at the same time.

These simple optical protection schemes are used to interconnect routers, switches, etc. or to subtending network elements to hand off clients. Again, the goal is switching within 50 ms with no sympathetic switching. Specifically, with both protection on the line and client-side protection on the associated clients, there is a scenario where a client-side switch, such as due to a failure of a client module or a fault in the client network, can lead to the detection of an anomaly in the line causing an undesirable protection switch. This can be referred to as a sympathetic switch.

Optical Switching Requirements

For the applications described herein, there is a requirement to support up to 6.3 dB loss on a link for long reach (LR) applications, or as much as 18 dB for extended reach (ER) applications. Of note, the OPS or TPT modules 10, 30 take up a lot of loss.

These applications can tolerate short-term optical loss of signal (LOS)/defects. This is a key requirement for the DSP 20. During TPT or OPS switches in a back-to-back configuration, the Rx will experience a short duration loss of light, loss of clock, loss of frame (or any unstable signal). The DSP/Rx needs to "ride through" these defects and not amplify by entering a re-initialization phase (recovery must typically be <10 ms from the clearing of the short duration signature). Currently we experience some plugs that amplify a few milliseconds of the short duration signature LOS to many seconds For the OPS module 10, we need the laser off fast (Tx). The laser off is used to initiate the OPS switch. There is a need to provide a mechanism to shut the laser off within 10 ms (inter-integrated circuit (I2C) register or SerDes Fast Tx Squelch mechanism). For the TPT module 30, we need one laser off fast and the other one fast on. The TPT (Y-Cable) switch is performed by turning lasers off on the current active card and then on the newly active card. Also, there is a need to provide a mechanism to shut the laser off within 10 ms (inter-integrated circuit (I2C) register or SerDes Fast Tx Squelch mechanism).

Fast Recovery

The general approach to fast recovery is to avoid DSP 20 adaptation at the Rx and simply switch with the same settings or predetermined settings. This way a protection switch to a different fiber can be realized within 50 ms. That is, the DSP 20 simply keeps the same settings or switches to the predetermined settings. The underlying assumption is that this application can support short term LOS or defects and not enter any re-initiation, optimization, adaptation, control loops, etc. The conventional DSP approach sees a few milliseconds of loss of light and amplifies this to many seconds to come back up. After the fast switch, the DSP 20 at the Rx can adjust or make changes, but the key here is there was not an automatic adaptation which could take seconds.

Further, another key requirement is the DSP holdoff loss of signal (LOS) or loss of light (LOL) reporting at the Rx. This requirement enables the host device to avoid acting on these faults before the adaptation holdoff is complete. This LOS/LOL reporting holdoff can be a configurable value.

Figure 5A:
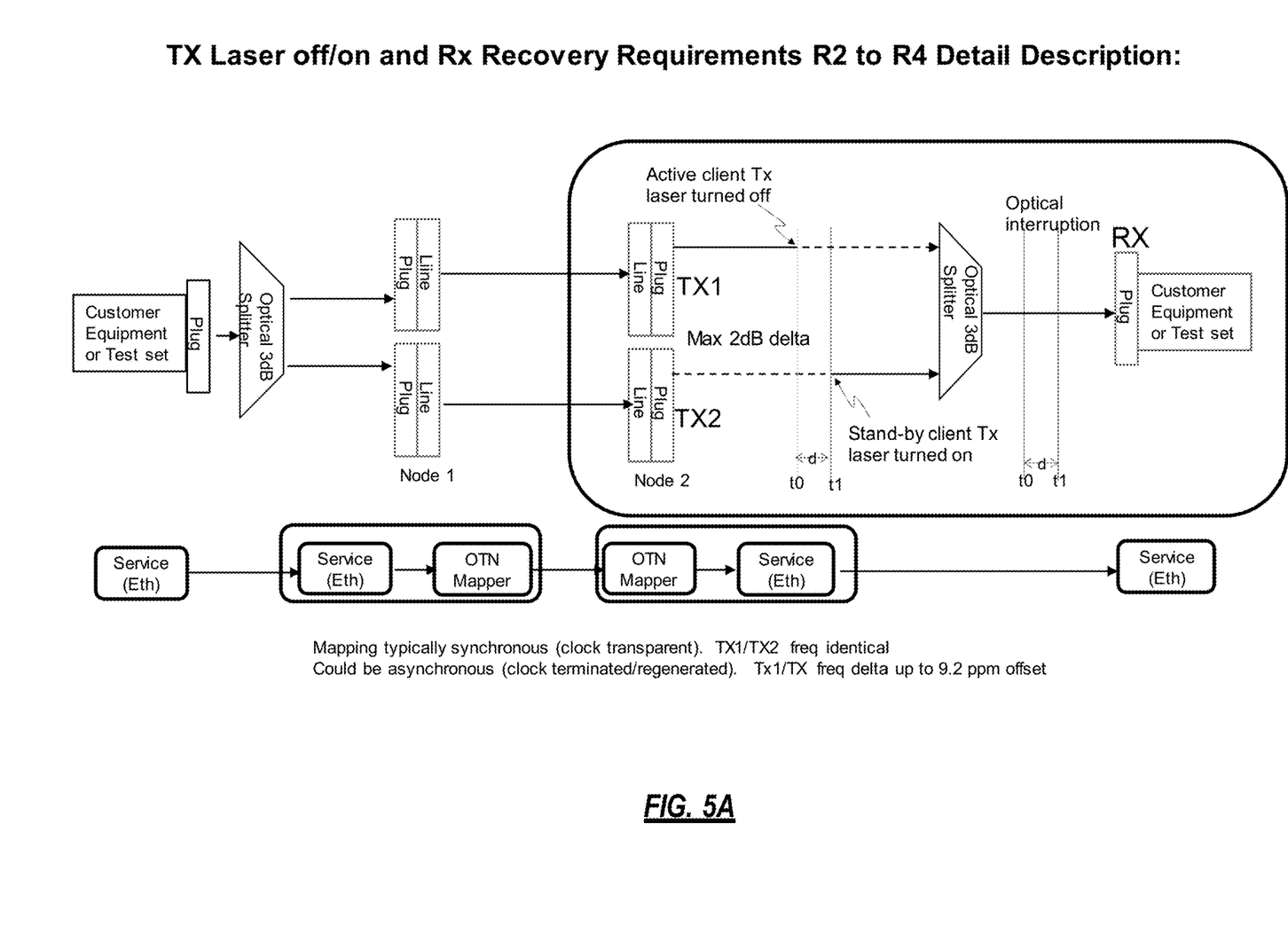
FIG. 5A is a diagram of a TPT configuration for illustration of laser off/on and Rx recovery requirements.
Figure 5B:
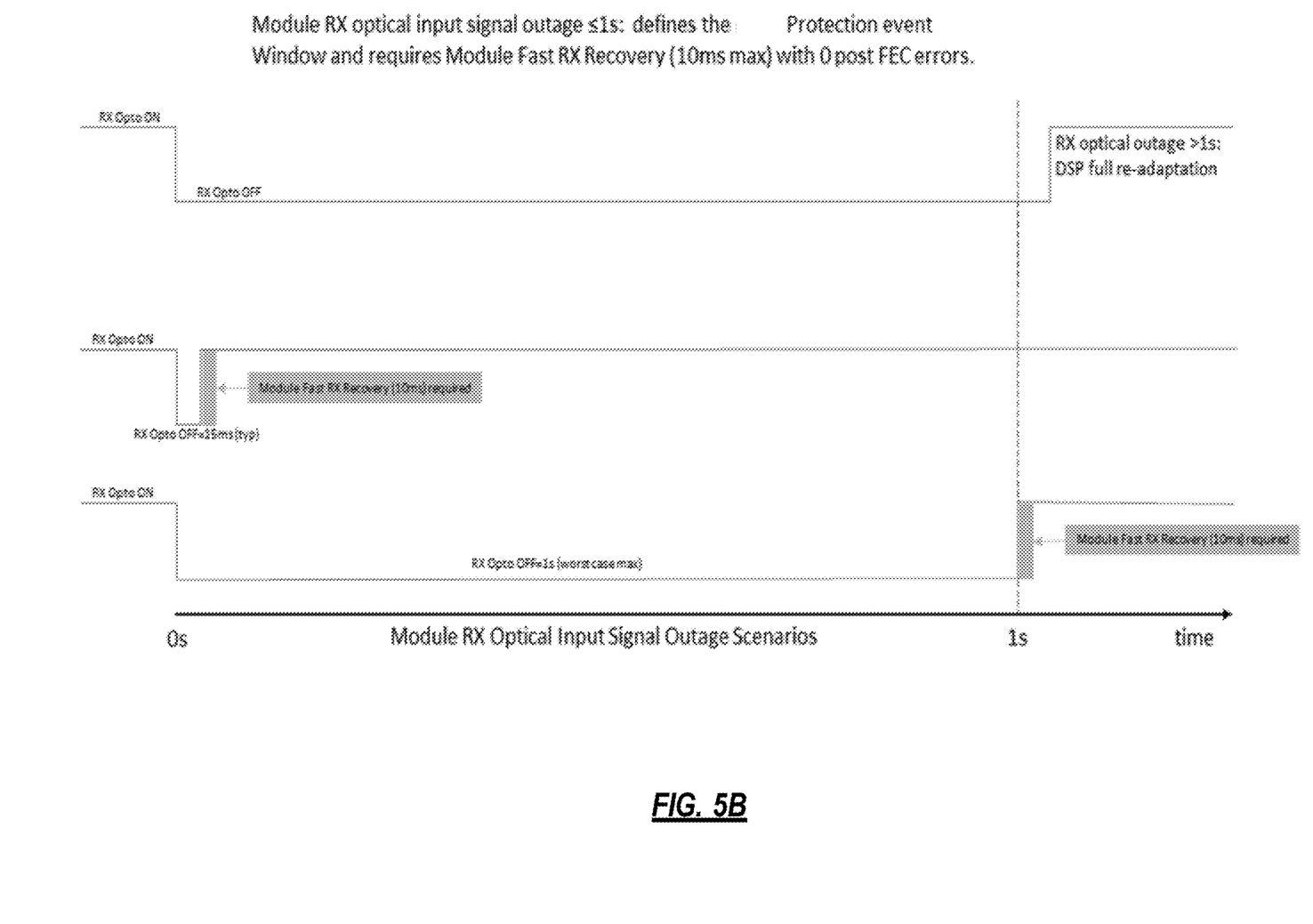
FIG. 5B is a diagram of an optical Rx signature on a switch, from the configuration in FIG. 5A.
Figure 6:
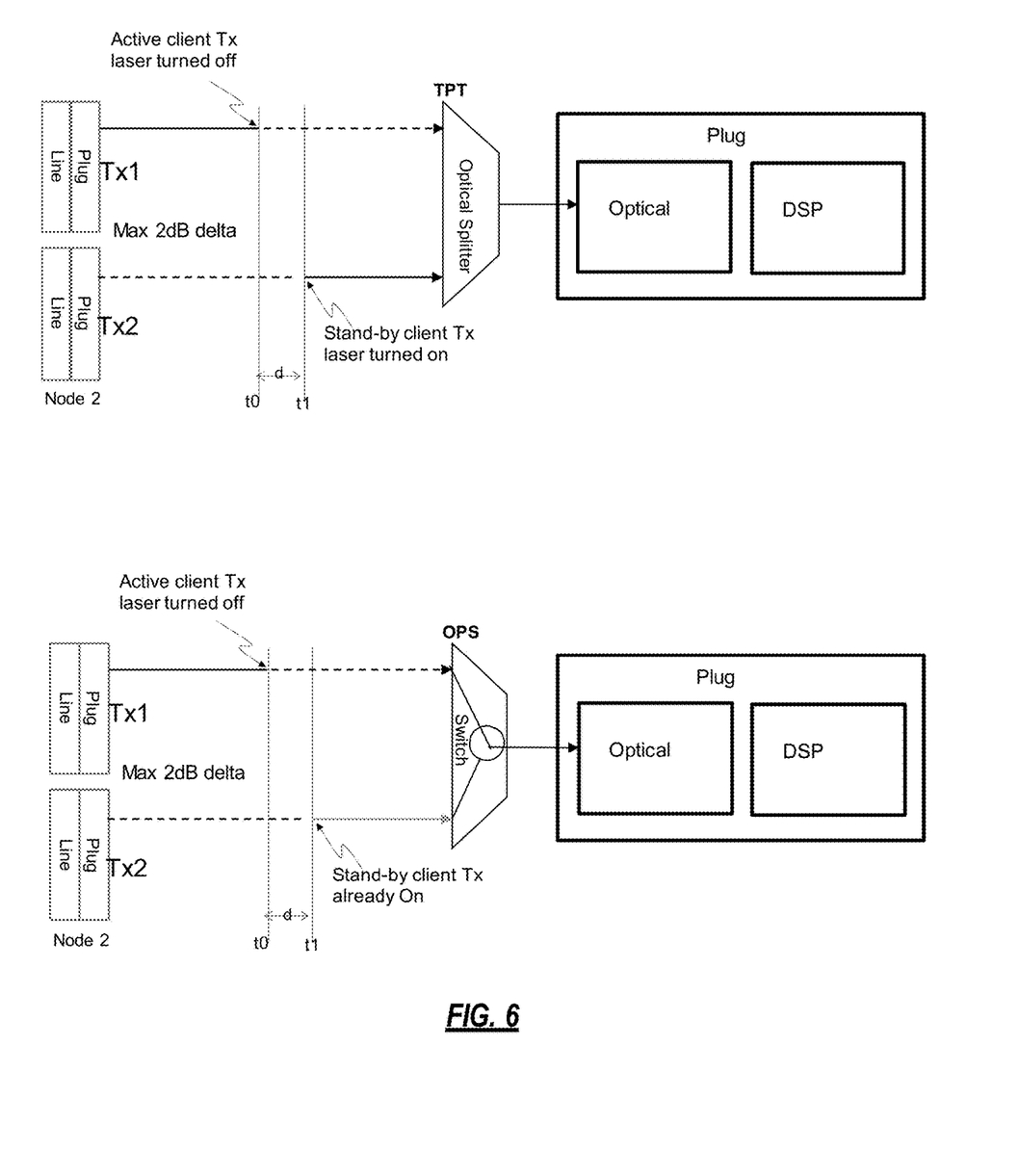
FIG. 6 is a diagram for illustrating three methods of DSP Rx fast recovery.
Figure 7:
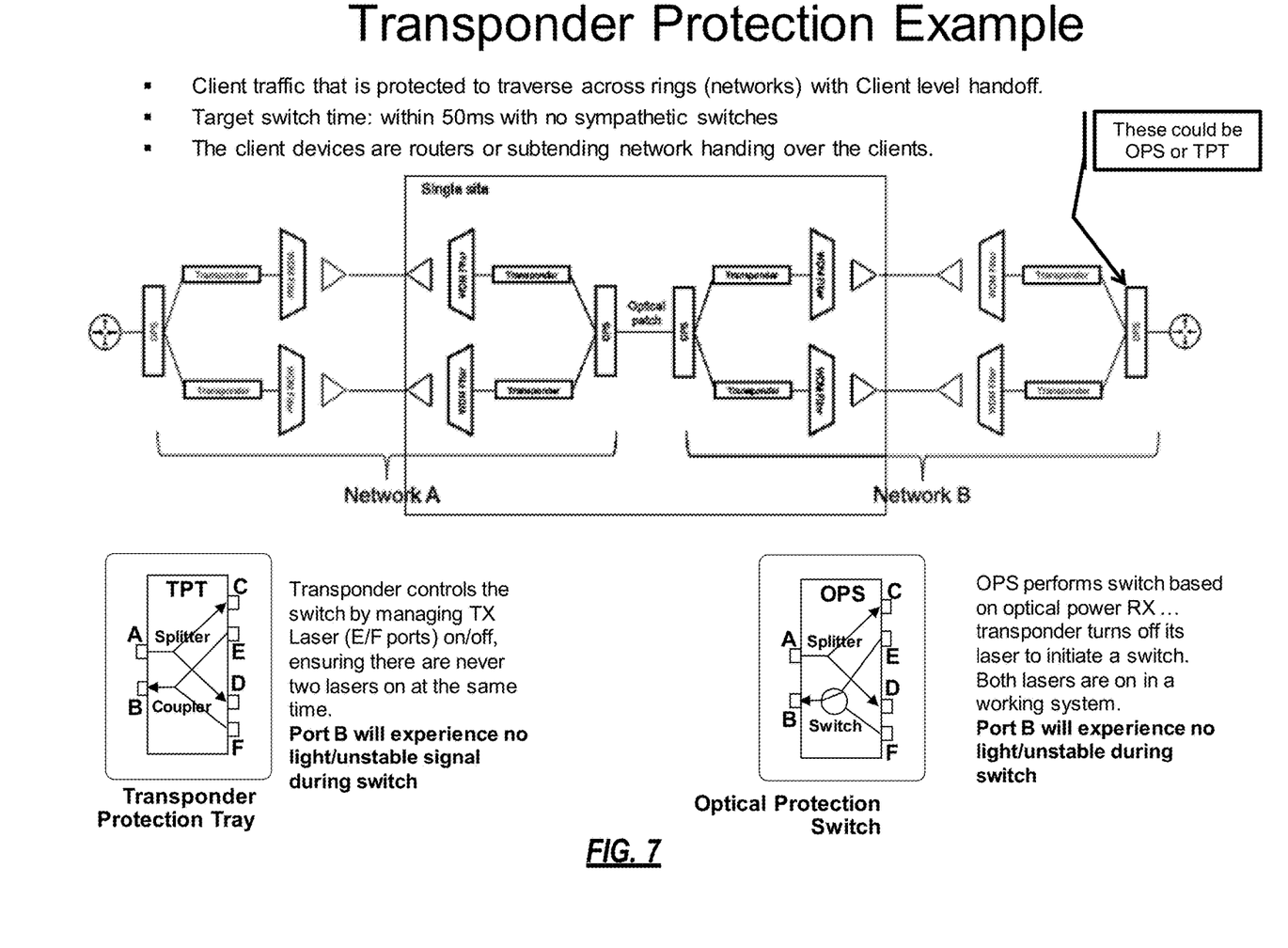
FIG. 7 is a diagram of a TPT and OPS protection example.

FIG. 5A is a diagram of a TPT configuration for illustration of laser off/on and Rx recovery requirements. FIG. 5B is a diagram of an optical Rx signature on a switch, from the configuration in FIG. 5A. FIG. 6 is a diagram illustrating three methods of DSP Rx fast recovery. FIG. 7 is a diagram of a TPT protection example. The following examples describe the fast recovery approach with respect to TPT, but these apply equally to OPS and other protection switching approaches. The key to the present disclosure is the functionality at the Rx DSP and optionally at the Tx DSP, the protection switching, and network configurations can be anything.

FIGS. 5A, 5B, and 6 include an example network/test configuration where there is a service layer (Ethernet (Eth)) connected between two optical transport network (OTN) mappers. On the right side, there is TPT protection from a client connected to the OTN mapper and to an adjacent router. Specifically, the OTN mapper includes two line interfaces connected to the other OTN mapper, and two "plugs" which are client-facing interfaces that connect to the router via TPT protection—two client Tx connecting to one Rx. In the TPT configuration, there is both a requirement for the two client Tx to turn off/on fast and for the Rx recovery. In an OPS configuration, there will be one client Tx to one Rx via two different paths, and there is only a requirement for Rx recovery. Of course, the example network/test configuration is presented for illustration purposes and those of ordinary skill in the art will recognize various other configurations are contemplated.

The present disclosure includes approaches at both the Tx side and the Rx side. Namely, there is a requirement for fast Tx on/off for some configurations, such as TPT, but not necessarily for the OPS, where there are no additional requirements at the Tx side. For both OPS and TPT, there is a Rx recovery requirement for the DSP 20.

Figure 9A:
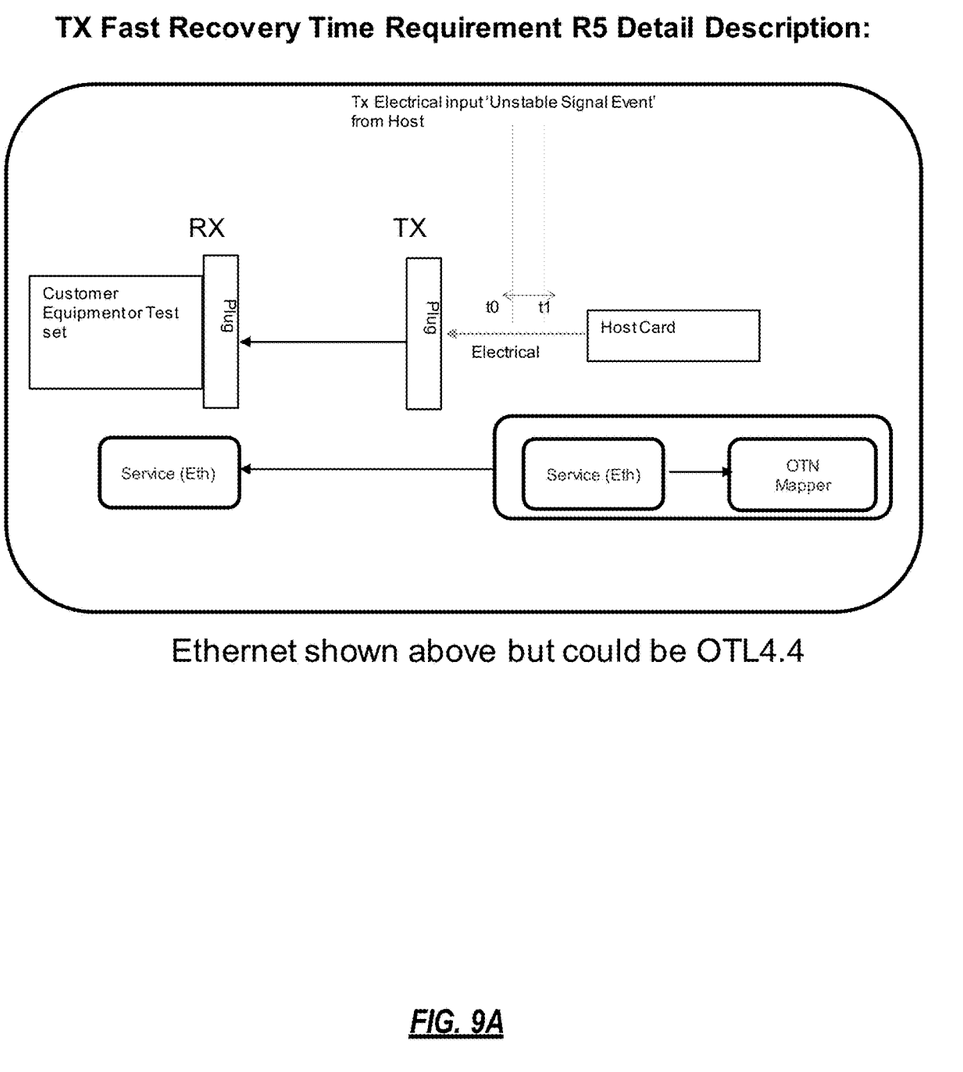
FIG. 9A is a diagram of a DSP Tx fast recovery approach.

FIG. 9 shows a diagram for the Tx (off-ramp) direction recovery which like Rx direction must recover fast. In this case the connection is electrical and signal sourced. The transceiver TX path must all recover from a TX unstable electrical signal event at the host electrical input interface (clock transient, framing transient) in <10 ms.

Optical Switching and Fast Recovery—Transceiver Requirements

There can be several requirements at a transceiver, modem, pluggable module, etc. for optical switching and fast recovery. Those skilled in the art will appreciate the present disclosure does not necessarily require all of these requirements, labeled R1-R5.

R1. Link budget—Support a link that allows for up to about a 6 to 18 dB loss between plugs (channel Insertion loss)

R2. Tolerate Short term Optical LOS/defects ( Rx Fast Recovery is key requirement for the DSP vendor )—During TPT or OPS switches, the Rx will experience short duration loss of light, loss of clock, loss of frame (or any unstable signal). The plug needs to "ride through" these defects and not amplify by entering a re-initialization phase (recovery must be <10 ms from the clearing of the short duration signature). Currently we experience some plugs that amplify a few milliseconds of the short duration signature LOS to many seconds.

R3. For OPS we need laser fast off—Laser off is used to initiate the OPS switch—must provide mechanism to shut laser off within 10 ms (I2C register or SerDes Fast Tx Squelch mechanism)

R4. For TPT we need laser fast off and fast on—The TPT (Y-Cable) switch is performed by turning lasers off on the current active card and then on the newly active card, must provide mechanism to shut laser off or on within 10 ms (I2C register or SerDes Fast Tx Squelch)

R5. TX Fast Recovery Time—The transceiver Tx path shall recover from a Tx unstable signal event at the host electrical input interface (clock transient, framing transient) in <10 ms.

Laser Off/on Requirements and Approaches

For TPT, there is a requirement for the Tx side to turn off and on fast. The fast turn off and on requirement is used when one Tx line is active but experiencing errors that causes a protection switch. As seen in FIGS. 5 and 7, the active client Tx has to be turned off at time to and the stand-by client Tx has to be turned on. The fast Tx off/on requirement in TPT is since both Tx are connected to the Rx. This is not the case in the OPS, where only one Tx line is connected. Thus, there is not necessarily a requirement for fast off/on in the OPS configuration.

Here, fast can be on the order of 10 ms, i.e., on or off in about 10 ms. There are a couple possible approaches.

1) Use of a fast Tx squelch mechanism, such as described in commonly-assigned U.S. Pat. No. 10,097,262, issued Oct. 9, 2018, and entitled "Client protection switch in optical pluggable transceivers activated through fast electrical data squelch," the contents of which are incorporated by reference in their entirety.

2) Use of I2C (management communication to the Tx to turn off). Some transmitters are compliant to a multi-source agreement (MSA) and this fast turn off needs to be on the order of 10 ms, and some MSA specifications may have looser requirements. Again, see U.S. Pat. No. 10,097,262 for a discussion on the MSA requirements. The I2C approach needs to be better than MSA specifications.

3) Proprietary implementations where the DSP vendor, optical Tx vendor, etc. has configured the Tx to turn off within the required period.

Of note, this fast off/on requirement is based on the fact a large number of existing Tx configurations do not support this natively. Of course, it is possible to have a Tx that can natively support these specifications.

Rx Switch Signature and Recovery Requirements

The protection scheme is configured to switch between the client Tx lines based on specific criteria. The Rx DSP 20 may not know which line it is receiving, but it does experience a time where there is no traffic, the present disclosure holds off any reacquisition at the Rx DSP 20 during this time, to hopefully enable a quick switch as any reacquisition would take seconds. This Rx DSP functionality is independent of the underlying protection scheme.

Rx recovery requirements are the same for OPS and TPT. The key here is the ability to withstand some period of poor traffic without causing some signal reacquisition that can take seconds.

For OPS, the protection switch is performed by an OPS module 10 or equivalent where a 1×2 switch selects one of the two client Tx lines. The selection can be based on power, LOS, LOL, bit error rates, explicit commands, etc. During the switch, there is a time period (t0 to t1 delta) where the Rx DSP 20 does not have light/traffic.

For TPT, the protection switch is actually performed at the client Tx or based on a break in one of the client Tx lines, since the TPT module 30 or equivalent includes a coupler connecting both client Tx lines to the Rx.

For the fast Rx recovery, there is a requirement for the Rx DSP 20 to identify a signature so that it knows a protection switch is occurring to let the Rx DSP 20 know so that it can start the fast Rx recovery process which basically includes holding off any reacquisition and LOS/LOL reporting. As such, the Rx DSP 20 is configured to holdoff reacquisition and LOS/LOL reporting for some time period. Of note, this can be a configurable aspect, i.e., the Rx DSP 20 is in a fast mode configuration. For example, this can be signaled using vendor user space bytes to the Rx DSP 20 or through some other configuration.

The signature can include—Rx Signature on switch (t0 to t1 delta), see FIG. 5B.

1) Signal condition (this can depend on client type, e.g., IEEE 802.3 local fault (LF) if Eth, and other conditions and protocols are contemplated)
2) No Light (up to 1 second, typical=15 ms)
3) Light, because the protection switch has occurred
4) Good clock and traffic—clock could be up 9.2 ppm offset from original clock for async mappings. For synchronous mappings clocks will be the same. 400G will be synchronous. 100G can be sync or async. Ethernet allows clocks to vary by up to +100 ppm, so an offset of 200 ppm between paths can potentially occur.

The Rx DSP 20 is configured to detect this signature when the fast switch mode is enabled. And upon detection, the Rx DSP 20 enters the fast switch mode performing configuration settings and LOS/LOL holdoff until a predetermined period.

The Rx DSP 20 fast recovery should be within 10 ms after receiving good traffic. For example, 400GigE can use FEC transparent monitor mode for Rx LOL detect, e.g., AM unlock for fast detect.

In an embodiment, the Rx recovery modes can be defined in a 100G, 400G, etc. module EEPROM vendor user space bytes. For example, the fast Rx recovery support advertising bits can include Fast Rx Auto Mode Supported [ON/OFF] and/or Fast Rx Manual Mode Supported [ON/OFF]. Rx Recovery Control Bits can include 3 settings: Standards compliant Rx recovery; Fast Rx Auto Mode; Fast Rx Manual Mode. Fast Rx Manual Mode Setting bits can include Tx1/Tx2 source select (default Tx1); Rx DSP settings for Tx1; and Rx DSP settings for Tx2. Further control bits include (DSP adaptation hold off (0 to 1 second), LOS reporting holdoff (0 to 1 second).

The fast Rx recovery mode should be about 10 ms after good traffic (stable signal). A Fast RX Auto Mode includes DSP recovery methods 1&3. A Fast Rx Manual Mode includes a DSP recovery method 2.

Method 1: Default starting point (good enough to carry traffic but not necessarily optimal). When transient occurs, use default and allow optimization/training after. Default values could be Vendor Standard across all plugs or factory calibrated.

1) The DSP chip saves the factory default starting point during calibration. Good enough to carry traffic but not necessarily optimal. When transient occurs, use default and allow optimization/training after.
2) When the traffic interruption (fault detect) lasts longer than provisioned adaptation holdoff, the DSP should have a complete retrain for the current link. When shorter than adaptation holdoff, DSP fetches the saved factory default parameters and recovers on these values. This option may require more strict engineering rules than Option 2 in terms of matching upstream Rx powers, ppm offset, temp, etc. Devices may need to be co-located with this option. Traffic interruption (fault detect): Requires fast detect.

Method 2: Can learn (train) on each path to determine any DSP recovery values (stored Tx1 and Tx2 values).

1) The DSP chip saves the parameters after CDR converges in the training stage. It saves two sets of parameters—one for Tx1, another for Tx2.
2) When the traffic interruption (fault detect) lasts longer than provisioned adaptation holdoff, DSP should have a complete retrain for the current link. When the traffic interruption lasts shorter than provisioned adaptation holdoff, DSP doesn't retrain. Instead, DSP fetches the saved parameters for the new link and applies these for the recovery (Tx1 if Tx2 last used and Tx2 is Tx1 last used).
3) Although DSP tunes the parameters to compensate for the voltage/temperature variation when link is up, the saved parameters are just the results of the initial training. Because when the link comes back, voltage/temperature are unknown anyway.

Traffic interruption (fault detect): Requires fast detect.

Figure 9B:
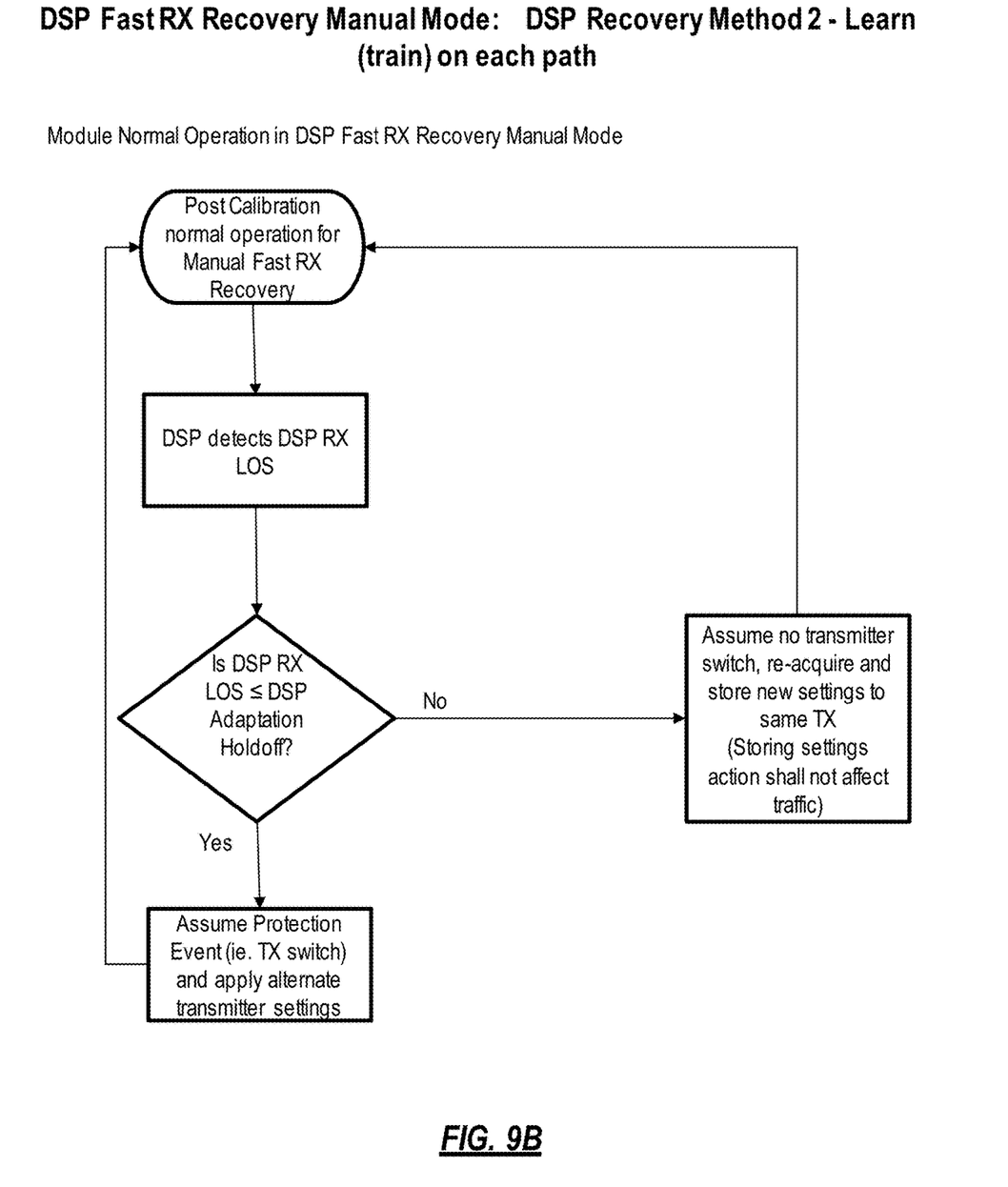
FIG. 9B is a flowchart of a DSP Fast RX Recovery Manual Mode, illustrating Module Normal Operation in DSP Fast RX Recovery Manual Mode.

Note: The Fast RX Recovery Method will require a Manual Fast Module Rx Recovery Calibration procedure to determine and store the optimal Rx DSP settings required for both Tx1 and Tx2. This calibration procedure will be performed at System level. To complement the system level calibration there is also a Module level post calibration procedure when in manual mode. See FIGS. 9B and 9C. This post calibration allows for automatic TX1/TX2 calibration to occur if the system level calibration did not occur or occur properly for some reason.

Figure 9C:
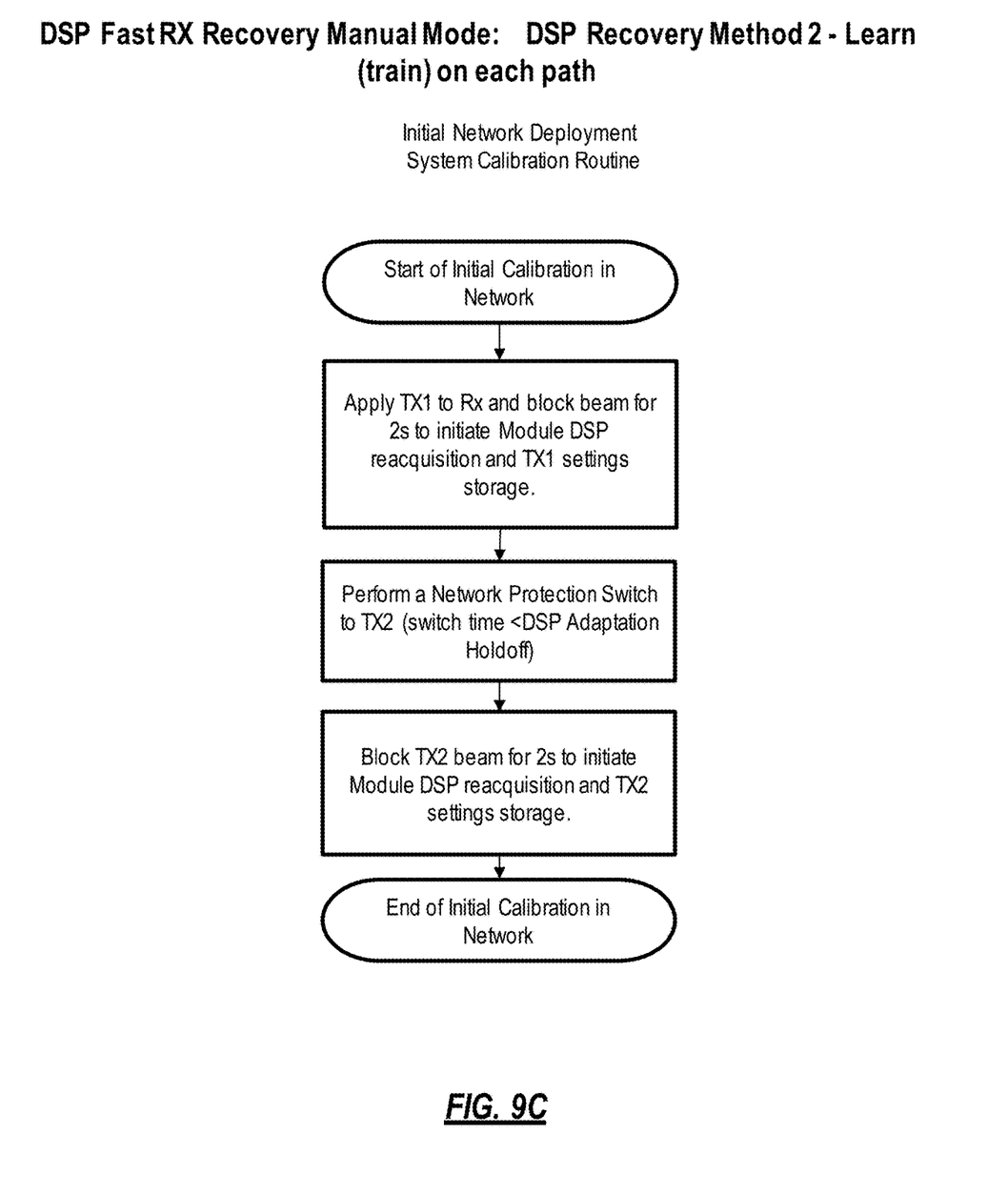
FIG. 9C is a flowchart of the DSP Fast RX Recovery Manual Mode, illustrating Initial Network Deployment—System Calibration Routine.

Proposed Manual Fast RX Recovery System Calibration Method (FIG. 9C)

1. Host to trigger Manual Fast Module Rx Recovery Calibration
2. Module to validate support of Fast Rx Manual Mode and switch to Fast Rx Manual Mode
3. Calibrate Receiver with Tx1 (framed traffic) and store Rx DSP settings in assigned Rx DSP settings for Tx1 Module EEPROM byte(s)
4. Calibrate Receiver with Tx2 (framed traffic) and store Rx DSP settings in assigned Rx DSP settings for Tx2 Module EEPROM byte(s)
5. Set Tx source to Tx1; and apply Rx DSP settings for Tx1
6. Terminate calibration procedure.

Proposed Manual Fast RX Recovery Module Post Calibration Method (FIG. 9B)
1. DSP detects DSP Rx LOS
2. If DSP LOS<=adaptation holdoff then assume this event is a protection switch and apply the alternate tx setting (if on TX1 apply TX2 and if on TX2 apply TX1)
3. If DSP LOS>DSP adaptation holdoff then assume this was not a protection switch (same Tx still connected). In this case, apply the full re-acquire Tx settings to the current TX (if on TX1 apply to TX1, if on TX2 apply to TX2).

Method 3: Holdover mechanism: Use values from Tx switched away from (e.g., Tx1 if switching to Tx2).

1) When the traffic interruption (fault detect) lasts longer provisioned adaptation holdoff, DSP does full adaptation recovery (involves retrain). When the traffic interruption lasts shorter than provisioned adaptation holdoff, DSP does not retrain. Instead, DSP just recovers with the current values. For example, if switching from Tx1 to Tx2, the current values used for Tx1 would be used.

2) This option may require more strict engineering rules than Option 2 in terms of matching upstream Rx powers, ppm offset, temp, etc. Devices may need to be co-located with this option.

DSP Recovery Methods 1&2 above require fast fault detect.

A provisionable adaptation holdoff can be 0 to 1 see in steps of 100 ms, as well as other values. This can include a Provisionable Plug Holdoff LOS/LOL reporting (avoids host equipment acting on these faults before adaptation holdoff is complete Since the standard plug interface for signaling plug LOS is slow (via I2C), this signal is not fast enough for DSP fault detection under Methods 1&2 where DSP fault detect triggers switching to use alternate recovery values. Method 3 (Fast RX recovery holdover mechanism) does not require a fast fault detect.

Fast Fault Detection

Possible Fast Fault Detect techniques are as follows (Fast Fault Detect required for Fast Rx Recovery Methods 1&2)

Fast Fault Detect Technique 1: Use FEC/PCS block within DSP for Ethernet rates—For Ethernet rates use physical coding sublayer (PCS)/forward error correction (FEC) block within DSP (examples as follows):

400GE: can use FEC transparent monitor mode for Rx LOL detect, e.g., AM unlock for fast detect. In this case the FEC/PCS is not terminated (re-timer mode) but can be monitored for faults. PCS layer fault detection is very fast (microseconds) so can be used as trigger for fast recovery when DSP needs to switch to different recovery values.

100GE: can use FEC termination mode for Rx LOL detect. e.g., AM unlock for fast detect. In this case the FEC/PCS is terminated and can be monitored for faults. PCS layer fault detection is very fast (microseconds) so can be used as trigger for fast recovery when DSP needs to switch to different recovery values.

Fast Fault Detect Technique 2: Use available plug reserved pins—For interfaces where there is no FEC or framing block, use the plug reserved pins as follows:

Host card detects fault (via framer) and drives reserved pin for fast notification to DSP. This would solve the issue where the plug LOS/LOL detect via I2C is too slow (100 ms max). OTU4 does not have the FEC transparent monitor option For QSFP-DD, the following pins may be used Pin 66 is used for VREF_TEST:MSA RESERVED pin. QSFP-DD analog VREF_TEST pin for factory test host. Includes series 10k resistor. Leave the pin unconnected or 10k to GND on normal hosts The other reserved pin in CMIS5.1 (pin 46) is now VS (Vendor specific) pin.

Other fault signaling methods are possible including modulating a code word on low speed signals such as ePPS, modSel, Vendor specifics pins VS1 to VS4.

Fast Fault Detect Technique 3: Photocurrent Loss of Signal Detect—Rate agnostic.

Configuration Settings

Once the Rx DSP 20 detects the fast switch mode, the Rx has to either maintain or change its configuration settings. Here, the Rx DSP 20 is first getting light from a working Tx client link, stops getting light and detects the fast switch mode, and then starts getting from a protection Tx client link. The Rx DSP 20 may have to do something to change its settings from the working Tx client link and the protection Tx client link. Note, the terms "working Tx client link" and "protection Tx client link" are used for illustration. These can be any types of fiber links.

There are a couple options. The following list is some example options, others are also contemplated. The optical module (e.g., pluggable), will have 2 fast recovery option modes as shown in FIGS. 5A and 5B (Fast Rx Auto Mode and Fast Rx Manual Mode). In manual mode it will have capability to store TX1 and TX2 settings.

1) Fast Rx Auto Mode. Change to or continue to operate at default settings, i.e., good enough to carry traffic but not necessarily optimal). When a transient occurs, use default settings, and allow optimization/training after. The default settings values could be Vendor Standard across all plugs, factory calibrated, provisioned, etc. In one embodiment, the default settings are used for both Tx client links. In another embodiment, the working Tx client link was optimized to optimal settings and the Rx DSP 20 switches to the default settings based on the fast switch mode.

2) Fast Rx Auto Mode Holdover where the optimal settings are used from the working Tx client link on the new protection Tx client link. For example, use the optimal settings for the working Tx client link if switching to protection Tx client link.

3) Fast Rx Manual Mode. Change to some predetermined settings for the protection Tx client link. Here, e.g., at provisioning, it is possible to determine the settings for both the working Tx client link and the protection Tx client link, and the settings for the protection Tx client link are stored and used when the fast switch mode is entered.

There can be a configurable adaptation holdoff setting as well, such as, e.g., 0 to 1 seconds in steps of 100 ms. After expiration of the adaptation holdoff setting and bad traffic, the Rx DSP 20 can start signal acquisition. Bad traffic may be based on some BER threshold or the link. Also, after expiration of the adaptation holdoff and bad traffic, the Rx DSP 20 can report LOS/LOL so that any host equipment can start acting on these faults.

EXAMPLE IMPLEMENTATION

1) The optical component notifies the Rx DSP 20 when the traffic is interrupted on the current link, such as through a LOS.

2) The optical component notifies the Rx DSP 20 when the traffic resumes on the other link.

3) The Rx DSP 20 saves the parameters after clock and data recovery (CDR) converges in the training stage. It saves two sets of parameters—one for TX1 (working Tx client link), another for TX2 (protection Tx client link).

4) When the traffic interruption lasts longer than 1 second, the Rx DSP 20 should have a complete retrain for the current link. Note, the term "retrain" is the same as adaptation, optimization, etc. When the traffic interruption lasts shorter than 1 second, the Rx DSP does not retrain. Instead, the Rx DSP 20 fetches the saved parameters for the new link and applies (TX1 if TX2 last used and TX2 is TX1 last used). This is to achieve 10 ms relink time.

5) Although the Rx DSP 20 tunes the parameters to compensate for the voltage/temperature variation when link is up, the saved parameters are just the results of the initial training. Because when the link comes back, voltage/temperature are unknown anyway.

Traffic interruption detection for fast recovery will likely need to come from the Rx DSP 20 and not rely on the plug Optical LOS as that may be too slow for detection.

Another way to improve Rx recovery time is to use two transmitters configured to function with the same Rx settings, either through calibration, adjustment at provisioning, or periodic adjustment of Tx parameters. One such approach is to select two transmitters that provide similar eyes so that there is no need for adjustment. For example, this could include similar transmitters such as a same module from the same vendor. Alternatively, the transmitters can be configured to operate with common Rx settings.

Rx DSP Process

Figure 8:
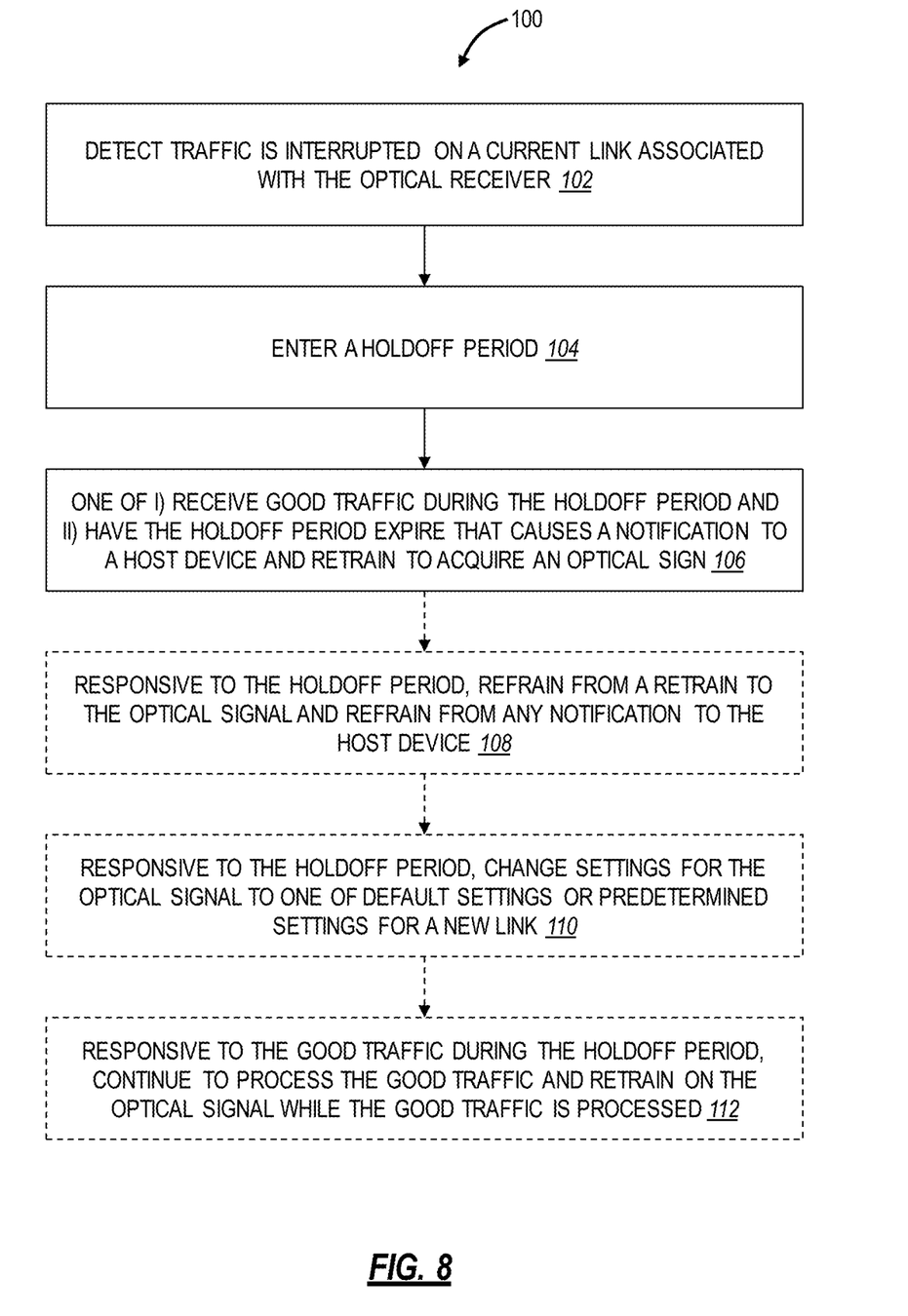
FIG. 8 is a flowchart of a process implementable by circuitry such as a Rx DSP.

FIG. 8 is a flowchart of a process 100 implementable by circuitry such as a Rx DSP 20. The process 100 includes detecting traffic is interrupted on a current link associated with the optical receiver (step 102), entering a holdoff period (step 104), and one of i) receiving good traffic during the holdoff period and ii) having the holdoff period expire that causes a notification to a host device and retrain to acquire an optical signal (step 106).

The process 100 can further include, responsive to the holdoff period, refrain from a retrain to the optical signal and refrain from any notification to the host device (step 108). The process 100 can further include, responsive to the holdoff period, change settings for the optical signal to one of default settings and predetermined settings for a new link (step 110). Settings for an optical signal can be maintained during the holdoff period. The notification can include any of loss of signal (LOS) and loss of light (LOL).

The process 100 can further include receive a configuration for a fast switch mode whereby the holdoff period is used. The process 100 can further include, responsive to the good traffic during the holdoff period, continue to process the good traffic and retrain on the optical signal while the good traffic is processed (step 112).

The optical receiver can be connected to an optical protection switch (OPS). The optical receiver can be connected to an optical coupler whereby two different links including the current link are capable of sending the optical signal; this can be the TPT. Corresponding optical transmitters on the two different links can be configured for fast turn off and turn on. The optical signal can include non-return-to-zero (NRZ) modulation, pulse amplitude modulation (PAM), or coherent modulation.

TX Fast Recovery Time Requirement R5 Detail Description

In FIG. 9A, Tx Fast Recovery Requirement means the transceiver Tx path shall recover in <10 ms from a Tx unstable event at the host electrical input interface (clock transient, framing transient). Vendor Optional, if required: Similar to Rx Fast Recovery Modes described previously, a fast Tx Recovery Mode can be implemented if required and where appropriate.

Tx Signature on Recovery (t0 to t1 delta)
1. Signal condition (depending on client type. e.g., 802.3 LF if Eth)
2. Data rate ppm offset (transients)
3. Electrical Squelch or invalid signal from Host (up to 1 second, typical=8 ms-15 ms)
4. Good clock and traffic (clock could be up 200 ppm offset from original clock) for Async mappings
   For synchronous mappings clocks will be the same
   400G or 100G can be sync or async depending on the mapping used

CONCLUSION

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, at least one processor, circuit/circuitry, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by one or more processors (e.g., any type of programmable circuitry or logic) that, in response to such execution, cause the one or more processors to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. Moreover, it is noted that the various elements, operations, steps, methods, processes, algorithms, functions, techniques, etc. described herein can be used in any and all combinations with each other.

What is claimed is:

1. A receiver (Rx) digital signal processor (DSP) in an optical receiver, the Rx DSP comprises circuitry configured to:
   detect traffic is interrupted on a current link associated with the optical receiver,
   enter a holdoff period where no loss of signal (LOS) or loss of light (LOL) is reported while an optical signal associated with the traffic i) is switched to a new link or ii) recovers from disruption on the current link, and
   one of i) receive good traffic during the holdoff period and ii) have the holdoff period expire that a) causes a notification to a host device and b) retrain the RX DSP to acquire the optical signal to receive the traffic on the new link or current link, wherein the Rx DSP is retrained to determine various settings on the optical receiver.

2. The Rx DSP of claim 1, wherein the circuitry is configured to
   refrain, during the holdoff period, from a retrain to acquire the optical signal and refrain from any notification to the host device.

3. The Rx DSP of claim 1, wherein the circuitry is configured to
   change settings, after entering the holdoff period, for the optical signal to one of default settings and predetermined settings for the new link.

4. The Rx DSP of claim 1, wherein settings for the optical signal are maintained during the holdoff period.

5. The Rx DSP of claim 1, wherein the notification includes one or more of loss of signal (LOS) and loss of light (LOL).

6. The Rx DSP of claim 1, wherein the circuitry is further configured to receive a configuration whereby the holdoff period is used.

7. The Rx DSP of claim 1, wherein the circuitry is further configured to
   responsive to receiving the good traffic during the holdoff period, continue to process the good traffic and retrain on the optical signal while the good traffic is processed.

8. The Rx DSP of claim 1, wherein the optical receiver is connected to an optical protection switch (OPS).

9. The Rx DSP of claim 1, wherein the optical receiver is connected to an optical coupler whereby two different links including the current link are capable of sending the optical signal.

10. The Rx DSP of claim 9, wherein corresponding optical transmitters on the two different links are configured for fast turn off and turn on.

11. The Rx DSP of claim 1, wherein the optical signal includes non-return-to-zero (NRZ) modulation.

12. The Rx DSP of claim 1, wherein the optical signal includes pulse amplitude modulation (PAM).

13. The Rx DSP of claim 1, wherein the optical signal includes coherent modulation.

14. The Rx DSP of claim 1, wherein a transmitter for the current link and a transmitter for protection link settings are adjusted such that there is no need to adjust the Rx DSP when switching between links.

15. A method implemented in a receiver (Rx) digital signal processor (DSP) in an optical receiver, the method comprises steps of:
   detecting traffic is interrupted on a current link associated with the optical receiver,
   entering a holdoff period where no loss of signal (LOL) or loss of light (LOL) is reported while an optical signal associated with the traffic is i) switched to a new link or ii) recovers from disruption on the current link, and
   one of i) receiving good traffic during the holdoff period and ii) having the holdoff period expire that a) causes a notification to a host device and b) retraining the Rx DSP to acquire an optical signal to receive the traffic on the new link or the current link, wherein the retraining includes determining various settings on the optical receiver.

16. The method of claim 15, wherein the steps include
   refraining, during the holdoff period, from retraining the optical signal and refraining from any notification to the host device.

17. The method of claim 15, wherein the steps include
   changing settings, after entering the holdoff period, for the optical signal to one of default settings and predetermined settings for the new link.

18. The method of claim 15, wherein settings for an optical signal are maintained during the holdoff period.

19. The method of claim 15, wherein the steps further include
   receiving a configuration whereby the holdoff period is used.

20. The method of claim 15, wherein the steps further include
   responsive to receiving the good traffic during the holdoff period, continuing to process the good traffic and retrain on the optical signal while the good traffic is processed.

* * * * *